US011652796B2

(12) United States Patent
Birk et al.

(10) Patent No.: US 11,652,796 B2
(45) Date of Patent: May 16, 2023

(54) METHOD AND ARRANGEMENT FOR CONTROL DATA EXCHANGE OF AN INDUSTRIAL EDGE DEVICE

(71) Applicant: Siemens Aktiengesellschaft, Munich (DE)

(72) Inventors: Gunther Birk, Erlangen/Buckenhof (DE); Markus Höfele, Mannheim (DE); Peter Kob, Heroldsberg (DE); Rolf Schrey, Mönchengladbach (DE); Armin Zeltner, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 279 days.

(21) Appl. No.: 17/029,910

(22) Filed: Sep. 23, 2020

(65) Prior Publication Data
US 2021/0092098 A1   Mar. 25, 2021

(30) Foreign Application Priority Data
Sep. 24, 2019   (EP) ...................................... 19199200

(51) Int. Cl.
G06F 21/00 (2013.01)
H04L 9/40 (2022.01)
(Continued)

(52) U.S. Cl.
CPC .......... H04L 63/0245 (2013.01); G06F 21/53 (2013.01); G06Q 30/0185 (2013.01);
(Continued)

(58) Field of Classification Search
CPC . H04L 63/0245; H04L 63/0823; H04L 67/10; H04L 41/22; H04L 63/0209;
(Continued)

(56) References Cited

U.S. PATENT DOCUMENTS 6,088,796 A    7/2000 Cianfrocca et al.
9,989,958 B2 *  6/2018 Asenjo ............... G05B 19/4185
(Continued)

FOREIGN PATENT DOCUMENTS

CN   104363221   2/2015
CN   107272608   10/2017
(Continued)

OTHER PUBLICATIONS

Office Action dated Aug. 31, 2021 issued in India Patent Application No. 202034038405.
(Continued)

Primary Examiner — Kendall Dolly
(74) Attorney, Agent, or Firm — Cozen O'Connor

(57) ABSTRACT

A method and edge device for controlling data exchange of an industrial edge device with an industrial automation arrangement and a data cloud, wherein the edge device includes a first communication connection to the industrial automation arrangement and a second communication connection to a network of the data cloud, where the edge device includes applications exchanging data, and where the edge device includes a control device to control the data to be exchanged, wherein whether data exchange of an application is controlled via the first communication connection and the data exchange is implemented directly via the second communication connection or vice versa is defined for each application, where a data flow control device ensures simultaneous direct data exchange by an application via both communication connections does not occur, such that rigorous checking of applications or containers within the applications with respect to data security is not required.

13 Claims, 2 Drawing Sheets

(51) Int. Cl.
  *G06F 21/53* (2013.01)
  *G06Q 30/018* (2023.01)
  *H04L 67/10* (2022.01)
  *H04L 41/22* (2022.01)

(52) U.S. Cl.
  CPC .......... *H04L 63/0823* (2013.01); *H04L 67/10* (2013.01); *G06F 2221/033* (2013.01); *H04L 41/22* (2013.01)

(58) Field of Classification Search
  CPC ..... H04L 63/10; H04L 63/12; H04L 63/1441; H04L 63/18; H04L 63/0236; H04L 63/105; G06F 21/53; G06F 2221/033; G06F 8/61; G06F 9/45558; G06F 2009/45595; G06Q 30/0185; G05B 19/4185; G05B 2219/31246; G05B 19/058; G05B 19/05; Y02P 90/02
  See application file for complete search history.

(56) References Cited

U.S. PATENT DOCUMENTS

| | | | |
|---|---|---|---|
| 10,466,678 | B2 | 11/2019 | Bauer |
| 10,924,419 | B1* | 2/2021 | Chitalia ................ H04L 45/64 |
| 2006/0064440 | A1 | 3/2006 | Perry |
| 2008/0222175 | A1 | 9/2008 | Houston et al. |
| 2014/0250493 | A1* | 9/2014 | Brandt ................ H04L 69/163 726/1 |
| 2014/0337277 | A1 | 11/2014 | Asenjo et al. |
| 2016/0210427 | A1 | 7/2016 | Mynhier et al. |
| 2017/0223110 | A1 | 8/2017 | Lawson et al. |
| 2018/0300124 | A1 | 10/2018 | Malladi et al. |
| 2018/0356792 | A1* | 12/2018 | Chao ..................... G06F 16/907 |
| 2019/0064787 | A1 | 2/2019 | Maturana |
| 2019/0176332 | A1 | 6/2019 | Galloway et al. |
| 2019/0317481 | A1 | 10/2019 | Glas et al. |

FOREIGN PATENT DOCUMENTS

| | | |
|---|---|---|
| CN | 107276975 | 10/2017 |
| CN | 109150914 | 1/2019 |
| CN | 109479056 | 3/2019 |
| DE | 102012205907 | 10/2013 |
| DE | 202019104954 | 9/2019 |
| JP | 2018-534651 | 11/2018 |
| KR | 1020040105767 | 12/2004 |
| KR | 1020150073625 | 7/2015 |
| KR | 1020150114921 | 10/2015 |
| KR | 1020170105554 | 9/2017 |

OTHER PUBLICATIONS

Office Action dated Feb. 2, 2021 issued in Korean Patent Application No. 10-2020-0123109.
EP Search report dated Mar. 25, 2020 based on EP19199200 filed Sep. 24, 2019.

* cited by examiner

METHOD AND ARRANGEMENT FOR CONTROL DATA EXCHANGE OF AN INDUSTRIAL EDGE DEVICE

BACKGROUND OF THE INVENTION

1. Field of the Invention

The invention relates to a method to control data exchange of an industrial edge device having an industrial automation arrangement and having a data cloud, and to an industrial edge device having a device to control data exchange of the edge device with an industrial automation arrangement and having a data cloud.

2. Description of the Related Art

Industrial automation arrangements, such as production plants for discrete goods or process plants, normally consist of a multiplicity of computer-controlled components, such as programmable logic controllers (PLCs) and other devices, such as Human Machine Interface (HMI) devices and the like. For a variety of reasons, these components that are networked with one another are conventionally segregated from public networks, i.e., the Internet, so as to avoid data attacks on the production facilities.

However, there is an increasing demand for the active components of the industrial automation arrangements hitherto operated in a data technology "island operation" to be able to exchange data with a public network, in particular a data cloud (also referred to below as "cloud"). There are many different reasons for this, such as different local automation arrangements are intended to be able to be networked with one another, control of the production operation is intended to be able to be performed from different locations worldwide, and/or instructions are intended to be able to be transferred into the automation arrangements and production data to be read out.

It is known to employ edge devices at the boundary between the private and the public network to regulate and control data exchange between the private networks of the automation arrangements and the public network, i.e., the cloud. The tasks of these edge devices can extend far beyond control of data traffic, i.e., applications and processes that cannot run on the programmable logic controllers can run on edge devices offering very high performance in terms of data technology. These are, for example, complex calculations, evaluations of production data, and/or archiving tasks. Particularly in the case of modern edge devices, it is possible to run encapsulated, containerized applications, known as "apps", on these devices. These apps can be obtained from a public application storage facility, known as an "app store". An app can thus be used, for example, to monitor production processes and form statistical information relating to performance, utilization, and/or faults and forward the information to a cloud server, where these data are stored at this location and can be further evaluated or retrieved from here by a monitoring instance, such as a manufacturing execution (MES) system.

In order to be able to perform their tasks, most apps or applications of the edge devices must therefore exchange not only data with the private automation network, but also other data with the cloud or the servers disposed there and communication partners. The edge devices therefore conventionally also have at least two separate communication channels, such as network cards, virtually separated networks or ports, where one of the communication channels is connected to the private automation network, and a further of the communication channels is connected to the cloud, i.e., connected, for example, to an Internet connection.

It is a clear requirement of many operators of the conventional industrial automation arrangements that the automation network, i.e., the private network with, for example, programmable logic controllers and other sensitive devices, and the cloud or the Internet, or, generally speaking, the public network, are clearly segregated from one another to avoid cyber-attacks, i.e., unauthorized access. Unauthorized access to production data or business secrets in general is therefore feared, and it is furthermore feared that industrial production will be disrupted by unauthorized access or attacks which, in the extreme case, can even mean a risk to production means and people.

To solve this problem, it is customary to protect the edge devices, which usually have a conventional PC architecture or server architecture, with conventional devices, in particular by installing a firewall with the limited access associated therewith to network addresses and, in particular, to transmission control protocol/Internet protocol (TCP/IC) ports, so that the communication is restricted to specific services, such as Hypertext Transfer Protocol Secure (HTTPS).

Here, the problem remains, however, that some applications require free, unhindered access to the automation network to be able to perform a multiplicity of tasks and therefore to be able to access a multiplicity of data and information in the private automation network, i.e., the automation arrangement.

In these cases, the provision of a firewall is difficult or impossible here, so that it is necessary to grant these applications uncontrolled access to the automation network. Obviously, such applications must not be granted access simultaneously to the public network, because a facility to attack the automation network via the corresponding application would otherwise be provided. Conversely, unhindered access to the cloud environment can of course also be provided, if this is necessary for any reason. Here, however, the application must be prevented from accessing the automation network to prevent the unwanted direct connection between the public network and the private network, i.e., the cloud and the automation network.

However, the overall result of these measures is that data security is difficult to implement in the case of applications that communicate with both the cloud and the automation network.

SUMMARY OF THE INVENTION

In view of the foregoing, it is therefore an object of the invention to provide a method improving data security in applications of industrial edge devices that require access to both an automation arrangement and a data cloud (cloud).

This and other objects and advantage are achieved in accordance with the invention by a method that ensures an edge device always has at least two separate physical network connections or, generally, communication connections, one of which serves to connect to the data cloud or cloud, and at least one other that serves to connect to the industrial automation arrangement or the local network. In the data management of the edge device or edge devices, it is possible to define whether a software component or an application in general can have direct data exchange either with the cloud or with a component (device) of the industrial automation arrangement or, generally speaking, the automation network, but not with both simultaneously. A specific, restrictive data access that is controlled by a control device can be enabled in each case for an indirect data connection to the other network level. The data management is performed by a data flow control device that administers the data traffic of the communication connections. However, for each of these components and applications, the control device and the data flow control device can nevertheless communicate with a switching layer that implements at least a firewall functionality in each case for the physical network connection or communication connection that is not routed directly onto the communicating components.

In accordance with the invention, the method controls data exchange of an industrial edge device with an industrial automation arrangement and with a data cloud, where the edge device has a first communication connection to the industrial automation arrangement and a second communication connection to a network of the data cloud, where the edge device is provided with a plurality of applications exchanging the data, and where the edge device is equipped with at least one control device to control the data to be exchanged, where the at least one control device is formed as a firewall or a content filter, i.e., with content-based filtering. For each of the applications, it is defined whether the data exchange of the respective application is either controlled by the control device via the first communication connection and the data exchange is implemented directly via the second communication connection or, conversely, the data exchange is implemented directly via the first communication connection and the communication is implemented by the control device via the second communication connection, and where it is ensured via a data flow control device of the edge device that an application does not exchange data directly via both communication connections simultaneously. As a result, the applications or containers (e.g., docker containers) with the applications do not need to be checked rigorously with respect to data security, because the protection against attacks is implemented in the centrally, separately administered control device with the firewall functionality or the content filter. Particularly, it is thereby ensured that a potentially vulnerable software component or application cannot simultaneously have uncontrolled data exchange with the automation arrangement and the data cloud (cloud).

It is also an object of the invention to provide an industrial edge device having a device to control data exchange of the edge device with an industrial automation arrangement and with a data cloud, where the edge device has a first communication connection to the industrial automation arrangement and a second communication connection to a network of the data cloud, where the edge device is provided with a plurality of applications consuming and/or providing the data and therefore exchanging data, and where the edge device is equipped with at least one control device to control the data to be exchanged, where the at least one control device is formed as a firewall or a content filter. The edge device is also equipped with a data flow control device, where the data flow control device is configured such that an application performs a direct data exchange with one of the communication connections and performs the data exchange with the respective other of the communication connections via the control device, and where the data flow control device is configured such that an application does not exchange data directly via both communication connections at the same time. The above-described advantages discussed with reference to the method in accordance with the invention are achieved via the presently described industrial edge device.

Advantageous embodiments of the invention are indicated in the dependent patent claims. The features and advantages described therein, in particular the method steps defined there, apply accordingly to the edge device in accordance with the invention also which is intended to be configured to perform the corresponding method steps in that the software components of the edge device, in particular the data flow control device, are programmed with corresponding software routines. The method steps or device features indicated in the embodiments can be implemented both individually and in appropriate combination with one another.

If a plurality of applications are installed on the edge device or a plurality of runtime environments (containers; docker containers, virtual machines) are installed, a user can, via a user interface of the edge device or the data flow control device, advantageously administer or specify the communication connection via which an application or an execution environment, a container or a virtual machine or the like communicates directly with the application, and the communication connection via which the same application or the like can exchange the data, controlled only via the control device. In one configuration, it is even possible to perform the administration such that an application or container or the like is given the facility during ongoing operation to modify this assignment autonomously, which is advantageous, for example, in a case where an application consists of a plurality of separate modules which have different access requirements.

Alternatively or additionally, a decision can also be made by the data flow control device itself to define which of the communication connections should be linked directly to an application or the like, and which other of the communication connections should be linked to the application via the control device. This is advantageously performed based on a set of rules, where, for example, it can be specified that an application or the like can have unfiltered access to the automation network or the automation arrangement only if the application meets certain security requirements. This can be done, for example, via a certificate that is assigned to the respective application. If this certificate is missing, or if it is incorrect or expired, then it can be stipulated that the application can exchange data only via the control device or is only ever allowed to communicate via one of the communication connections. Other consequences can also be specified, such as both communication connections must be routed via the control device or via two separate control devices. The set of rules can also make the decision based on the application type or the manufacturer of the application. It is thus possible to specify, for example, that an application (or app) that demonstrably originates from the same manufacturer and that also provided the components of the automation arrangement is always allowed direct access to the automation network, or the like.

The control device is advantageously installed as an application on the edge device. This offers the advantage that a regular update of the control device or the security regulations defined therewith is always easy to perform. The installation of a plurality of different control devices on one and the same edge device is thereby simultaneously enabled, whereby different security levels can be implemented for different applications. The control device advantageously not only has a firewall functionality, but can also check the content of the data streams that are to be controlled. For this purpose, it is advantageously possible to obtain and install description files containing instructions for investigating the data streams from the manufacturer of the automation arrangement or the components (e.g., programmable logic controllers, or HMI devices) installed therein or from a third party. Such information can be provided, for example, in the form of XML files, where the XML files indicate keywords or markers that can be re-identified in a data stream to be investigated and that mark the sensitive data that may need to be filtered or blocked. In particular, in one advantageous embodiment, it is also possible to control and, if necessary, block parameter queries that are transmitted, for example, via the Open Platform Communications (OPC) Unified Architecture (OPC-UA) protocol, particularly with respect to unwanted write access from the application in the direction of the automation arrangement.

The application or the applications is/are each advantageously installed with an application container in a virtual execution environment on the edge device, where precisely one application is advantageously installed in each case in each container and each container is run in a separate virtual execution environment. It is thus possible to specify each assignment of the direct or controlled data access for the corresponding container, where, for example, a container can be assigned to a service provider or other person and this person can alternately operate different applications in this container without constantly having to re-administer the data access assignment. Thus, for example, a service provider who is intended to supply raw materials for an automation arrangement can independently operate an app or an application which provides him with information relating to corresponding stock levels. In this case, the container which is assigned to this service provider would have restricted read access to the automation arrangement to be able to read out the corresponding stock levels.

The data exchange is advantageously controlled by routing one of the communication connections for each container directly to this container, and by routing the respective other communication connection via the control device to this container. This can be controlled, e.g., either via the general firewall rules or the described access filter, or the network connection is assigned directly on authorization via the control device. The system is easily and quickly administrable through the simple routing or rerouting of communication connections, i.e., the assignment of the communication connections to execution environments or runtime environments, as in this example the containers. In addition, the routing of the communication connections offers the advantage that the data exchange is unhindered, particularly on the direct channel, and can therefore occur very quickly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An example embodiment of the invention will be explained below with reference to the drawings, which simultaneously serves to explain an exemplary embodiment of the edge device in accordance with the invention and, in which.

DETAILED DESCRIPTION OF THE EXEMPLARY EMBODIMENTS

Figure 1:
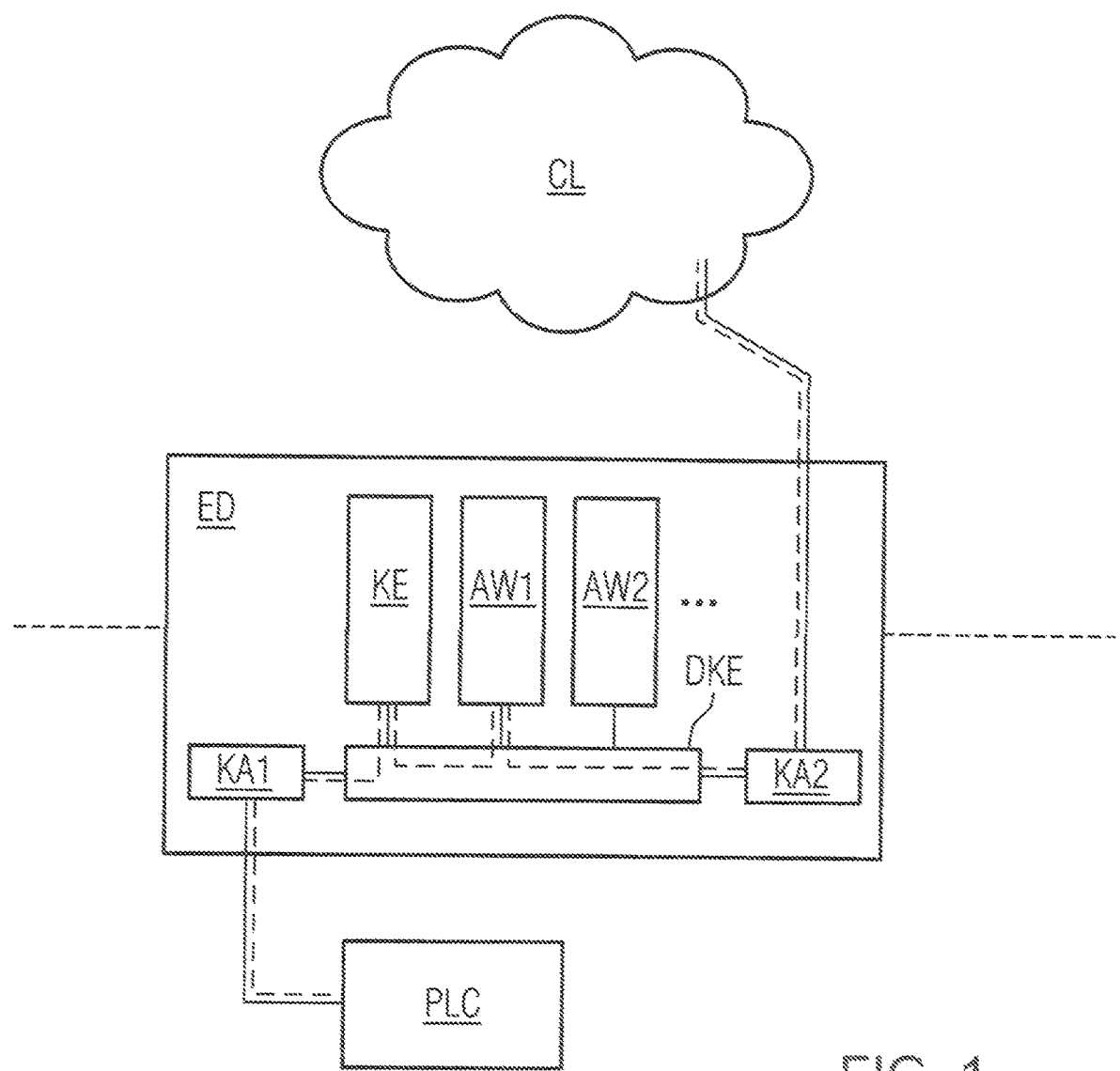
FIG. 1 is a schematic illustration an edge device with applications and the components for data exchange with, on the one hand, the data cloud (cloud) and, on the other hand, the automation arrangement (here: PLC—programmable logic controller) in accordance with the invention.

FIG. 1 shows a public area with a data cloud CL (cloud) in the upper part, i.e., above a broken dividing line. Below the broken dividing line, a private domain is shown, here an industrial automation arrangement, in which a programmable logic controller PLC is shown by way of example as a component. The edge device ED, with the communication connections KA1, KA2, is shown at the boundary between the two areas. The communication connection KA1 is a proprietary port for an automation network (e.g., Profinet) to which the programmable logic controller PLC, shown by way of example, is connected. The communication connection KA2 is connected to a public network, i.e., the Internet, and communicates with a cloud server (not shown) in the data cloud CL. Although only two connections KA1, KA2 are shown in this simplified example, it should be understood a plurality of communication connections of any type that can be operated in accordance with the method of the invention are also operable in real edge devices ED.

Firmware of the edge device ED comprises a data flow control device DKE that controls operation of the communication connections KA1, KA2 and channels the data streams routed via these communication connections KA1, KA2, in particular feeds the data streams to different execution environments. The data streams are each bidirectional data streams. The edge device ED comprises a multiplicity of virtual execution environments in which docker containers are instantiated, where an application AW1, AW2 can be operated in each of these containers. The control device KE is operated in a further container, where the control device KE is configured to control and, if necessary, filter one or more data streams with respect to their addressing (firewall functionality) and/or with respect to their content.

The edge device ED and, in this exemplary embodiment specifically the firmware with the data flow control device DKE, represents a user interface, specifically a Web interface, with which the data flow of the application AW1, AW2, the control device KE and, in particular, the communication connections KA1, KA2 can be configured.

It is assumed subsequently that the application AW1 is intended to retrieve production data from the automation arrangement, specifically from the programmable logic controller PLC, and to provide the retrieved data to a number of Supervisory Control and Data Acquisition (SCADA) systems (not shown) in the data cloud CL, i.e., the cloud. Administration is accordingly performed via the user interface of the data flow control device DKE such that the data connection is intended to be routed from the programmable logic controller PLC via the communication connection KA1 and via the control device KE, and is finally intended to end at the application AW1. A second data stream is routed between the application AW1 and the data cloud CL via the communication connection KA2. The data streams are indicated in FIG. 1 by broken lines based on the connection lines of the corresponding units.

The control device KE is administered via the user interface of the data flow control device DKE such that the data stream between the programmable logic controller PLC via the communication connection KA1 through to the application AW1 is filtered by a data diode. This means that only query commands, specifically in accordance with the OPC-UA protocol, which are geared toward the querying of variables in the programmable logic controller PLC, are allowed to be transmitted in the direction from the application AW1 to the programmable logic controller PLC. All other commands or messages from the application AW1 in the direction of the programmable logic controller PLC are suppressed by the control device KE. In the opposite direction, the control device KE allows only data packets with messages (response messages) in accordance with the OPC-UA protocol that transport the corresponding authorized contents. The data filtered in this way are processed in the application AW1 and can be retrieved via the data cloud, i.e., for example, the Internet, as the communication medium between the servers of the data cloud CL and the edge device ED. To accomplish this, the communication connection KA2 is accessible in a conventional manner by the application AW1. This does not necessarily mean that this access is completely uncontrolled; a conventional firewall, for example, can be interposed. However, it is not wanted and not necessary in this example to perform a content filtering in respect of data traffic between components in the data cloud CL and the application AW1.

With the presently disclosed method, it is guaranteed in the specific example embodiment that cyber-attacks from the Internet or from the data cloud CL on the industrial automation arrangement and specifically the device shown here (programmable logic controller PLC) can be effectively prevented, but the data required from the programmable logic controller PLC are provided by the latter.

Instead of the described method for administration via a user interface, the application AW1 can also be provided with a certificate that states a retrieval of data from a connected programmable logic controller PLC or other components is permitted subject to filtering via a data diode, and that unlimited access from a public area (Internet, data cloud, cloud) is likewise simultaneously permitted. The data flow control device DKE can then switch the data streams in the edge device ED accordingly based on the content of the certificate. The control device KE can simultaneously also be accordingly set to meet the requirements that are defined in the certificate.

Figure 2:
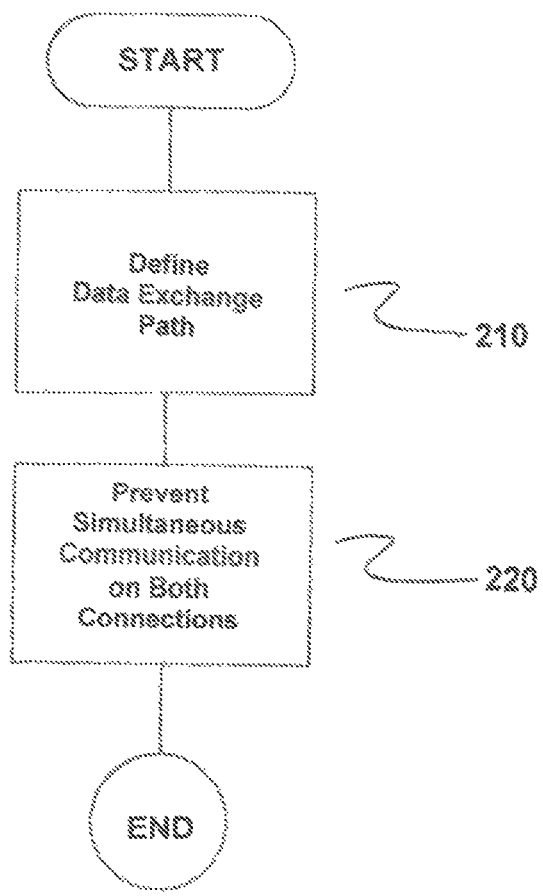
FIG. 2 is a flowchart of the method in accordance with the invention.

FIG. 2 is a flowchart of the method for controlling data exchange of an industrial edge device ED with an industrial automation arrangement PLC and with a data cloud CL, where the edge device ED includes a first communication connection KA1 to the industrial automation arrangement PLC and a second communication connection KA2 to a network of the data cloud CL, a plurality of applications AW1, AW2 exchanging the data, and at least one control device, formed as one of a firewall and a content filter, for controlling the data to be exchanged. The method comprises defining whether the data exchange of the respective application is either (i) controlled by the control device KE via the first communication connection KA1 and implementing the data exchange directly via the second communication connection KA2 for each of the applications AW1, AW2 or (ii) implemented directly via the first communication connection KA1 and implemented by the control device KE via the second communication connection KA2 for each of the applications AW1, AW2, as indicated in step 210.

Next, prevention of simultaneous direct data exchange by an application via both communication connections is ensured via a data flow control device DKE of the edge device ED, as indicated in step 220.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method to control data exchange of an industrial edge device with an industrial automation arrangement and with a data cloud, the industrial edge device including a first communication connection to the industrial automation arrangement and a second communication connection to a network of the data cloud, a plurality of applications exchanging the data, and including at least one control device, formed as one of a firewall and a content filter, for controlling the data to be exchanged, the method comprising:
   defining whether the data exchange of the respective application is one of (i) controlled by the control device via the first communication connection and implementing the data exchange directly via the second communication connection for each of the applications and (ii) implementing the data exchange directly via the first communication connection and implementing the communication by the control device via the second communication connection for each of the applications; and
   ensuring, via a data flow control device of the industrial edge device, simultaneous direct data exchange by an application via both communication connections is prevented.

2. The method as claimed in claim 1, wherein the communication connection via which an application communicates directly and the communication connection via which the same application exchanges the data via the control device are administered by a user interface.

3. The method as claimed in claim 1, further comprising:
   deciding, by the data flow control device based on a set of rules, whether to define which of the communication connections is linked directly to an application, and which other communication connection of the communication connections is linked to the application via the control device.

4. The method as claimed in claim 3, wherein the decision is performed based on at least one certificate which is assigned to a respective application.

5. The method as claimed in claim 4, wherein in an event of a missing or incorrect certificate, the application at least one of (i) exchanges data only via the control device and (ii) becomes linked to only one communication connection of the communication connections.

6. The method as claimed in claim 3, wherein the decision is performed based on an application type or a manufacturer of the application.

7. The method as claimed in claim 4, wherein the decision is performed based on an application type or a manufacturer of the application.

8. The method as claimed in claim 5, wherein the decision is performed based on an application type or a manufacturer of the application.

9. The method as claimed in claim 1, wherein the control device is installed as an application on the industrial edge device.

10. The method as claimed in claim 1, wherein the applications are each installed as an application container in a virtual execution environment on the industrial edge device; and
    wherein precisely one application is installed in each container and each container is executed in a separate virtual execution environment.

11. The method as claimed in claim 10, wherein the data exchange is controlled by routing one communication connection of the communication connections for each container directly to one container, and by routing a respective other communication connection via the control device to said one container.

12. The method as claimed in claim 1, wherein the data flow control device comprises a routine of firmware of the industrial edge device; and
    wherein the routine is configured to one of (i) control and (ii) monitor the communication connections of the industrial edge device.

13. An industrial edge device comprising:
    at least one controller which controls data exchange of the industrial edge device with an industrial automation arrangement and a data cloud;
    a first communication connection to the industrial automation arrangement and a second communication connection to a network of the data cloud;
    a plurality of applications at least one of (i) consuming and (ii) providing the data such that said data is exchanged; and
    a data flow control device configured such that an application performs direct data exchange with one communication connection of the first or second communication and performs the data exchange with a respective other communication connection of the first or second communication connection via the control device, and configured such that simultaneous direct data exchange by an application via both the first and second communication connections is prevented;
    wherein the at least one controller additionally forms one of a firewall and a content filter to control the data to be exchanged.

* * * * *